M. W. LYDON.
FOUNTAIN.
APPLICATION FILED MAY 8, 1918.
1,324,164.
Patented Dec. 9, 1919.
2 SHEETS—SHEET 1.
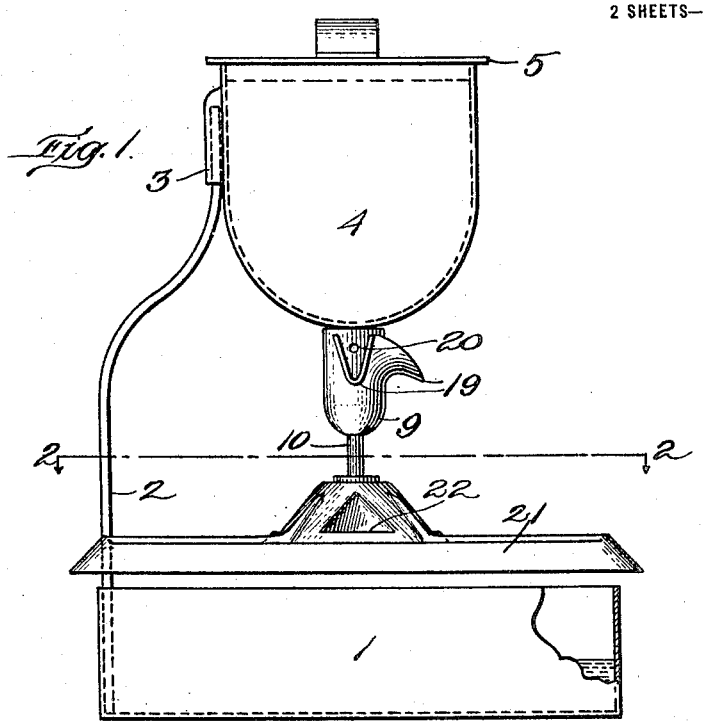
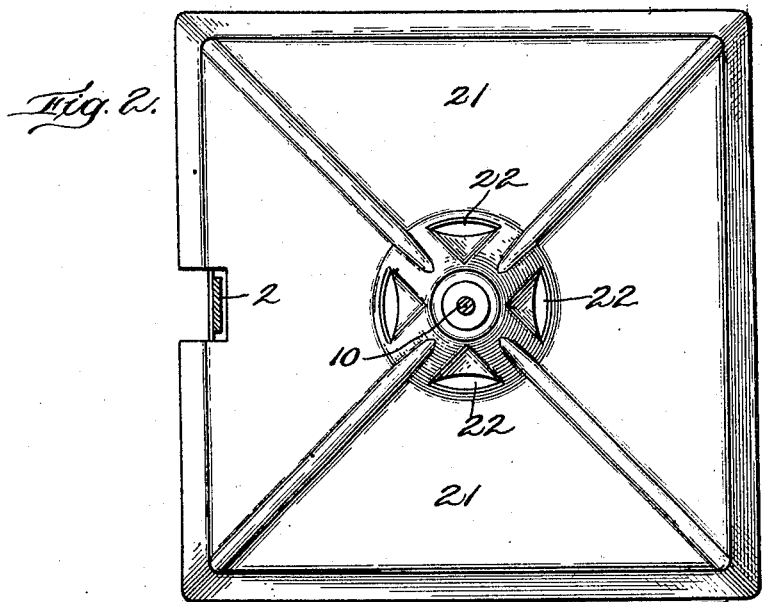
Inventor:
Martin W. Lydon
by Joseph T. Brennan
Atty M. W. LYDON.
FOUNTAIN.
APPLICATION FILED MAY 8, 1918.
1,324,164.
Patented Dec. 9, 1919.
2 SHEETS—SHEET 2.
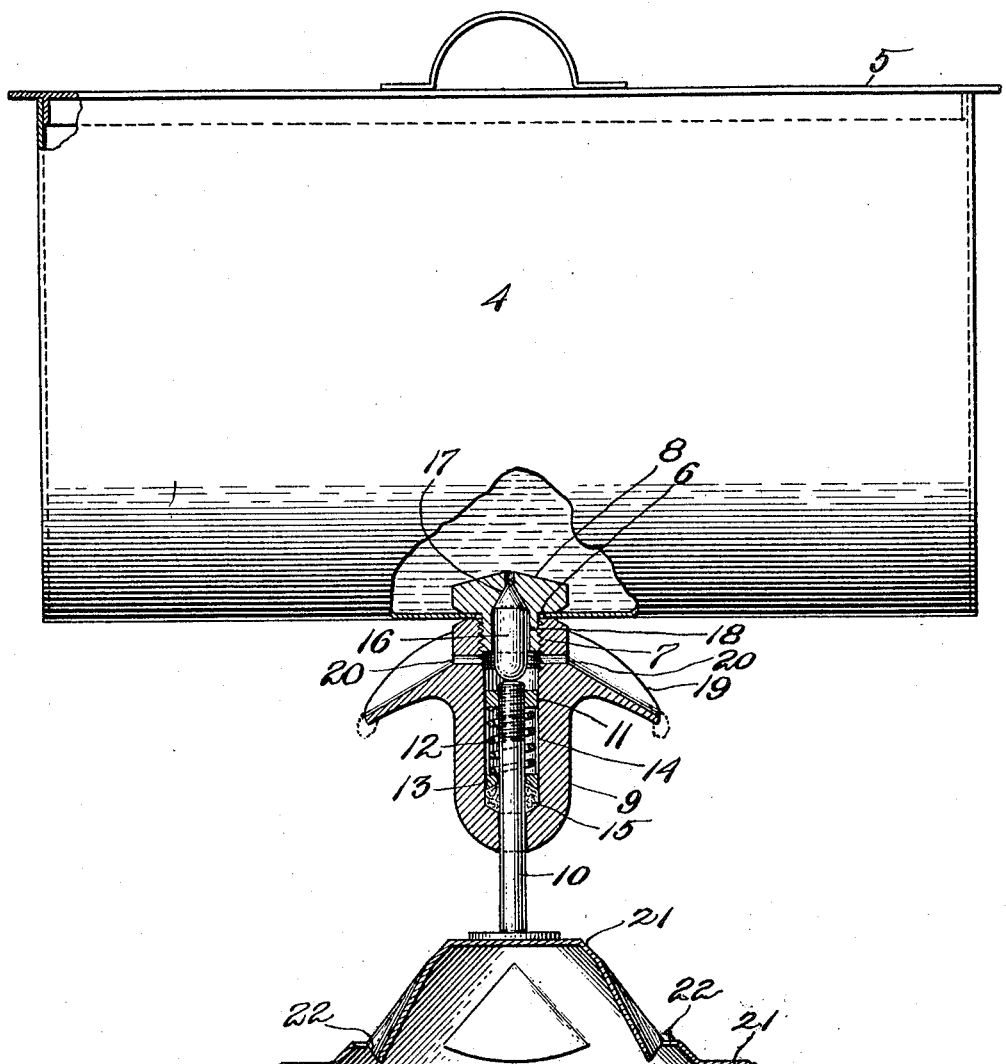

UNITED STATES PATENT OFFICE.

MARTIN W. LYDON, OF ANDOVER, MASSACHUSETTS.

FOUNTAIN.

1,324,164.

Specification of Letters Patent.

Patented Dec. 9, 1919.

Application filed May 8, 1918. Serial No. 233,256.

*To all whom it may concern:*

Be it known that I, MARTIN W. LYDON, a citizen of the United States, residing at Andover, in the county of Essex and State of Massachusetts, have invented certain new and useful Improvements in Fountains, of which the following is a specification.

My invention relates to fountains for supplying water to poultry and the like, and it has for its object to provide an automatically operated structure of this class particularly adapted for use by young fowls such as chickens.

To a considerable extent it is the practice to supply water to very young chickens and the like in an open dish that is set upon the ground, and the chickens, in drinking from the same, invariably climb upon and into the dish so that the water is soon contaminated and made foul. Another objectionable feature of the common dish or container is that chickens in drinking therefrom naturally deposit a certain amount of saliva in the operation and if one of the brood is diseased this salivary secretion from the mouth mixed with the standing water causes diseases and disorders to be transmitted from the sick to the healthy chickens and a great many more are lost through death from this cause than would otherwise be the case. My improved fountain is so constructed that it is automatically operated by the poultry seeking water so as to deliver water from a reservoir in regulated, sanitary fashion, preferably in drops, into position to be consumed, the water within said reservoir being inaccessible to the poultry and being discharged therefrom into accessible position only when the fountain is approached by one or more seeking water. In the best form of my invention the water is delivered from the reservoir onto a shelf in very small quantities, where, through capillary attraction, it remains sufficiently long for the chicken to take it off. Also, in the best form of my invention, a catch-basin is provided located below said shelf, into which any overflow from the latter falls, the contents of said catch-basin being inaccessible to the fowls. The shelf referred to preferably occupies an elevated position and is so shielded as to make it impossible for the chicken to climb or stand upon and soil the same.

Other features of my invention are hereinafter pointed out.

In the accompanying drawings:—

Figure 1 is a side elevation of a drinking fountain for poultry and the like embodying one form of my invention;

Fig. 2 is a section on line 2—2 of Fig. 1;

Fig. 3 is a partial front view of the fountain shown in Fig. 1.

Having reference to the drawings, 1 represents the base of the fountain, said base being herein shown as made from galvanized sheet metal formed into a pan which serves, as described later, as a catch-basin. To this pan or basin 1 is permanently fastened the lower end of an upright or standard 2 whose upper end is loosely received within a socket 3 provided upon the rear side of a reservoir 4 adapted to hold a supply of water. This reservoir 4, as well as its removable cover 5, is preferably also made from galvanized sheet metal. The bottom of the reservoir 4 is formed with a hole 6 through which an exteriorly threaded stud 7 extends, said stud being integral with a head or enlargement 8 provided at its upper or inner end. The threaded stud 7 is received within the interiorly threaded upper end of a hollow member 9 into which the upper end of a stem 10 projects. The upper end of the stem 10 occupies the chamber 14 within member 9 and is threaded to receive upon it a nut 11 whose under side provides a shoulder which rests upon the upper end of a coiled spring 12, also arranged within chamber 14. At its lower end the spring 12 is seated upon a gland 13 loosely surrounding and also freely movable vertically within chamber 14. Between gland 13 and the lower end of chamber 14 packing 15 is provided to prevent leakage from the lower end of the chamber. Spring 12 is under slight compression and acts through nut 11 and stem 10 to normally hold a valve 16 upon its seat 17, said valve being loosely mounted within a port 18 formed through stud 7.

Near its upper end the member 9 is formed upon its exterior with a plurality of outwardly and downwardly extending trough-shaped arms or shelves 19, and immediately above each shelf 19 the member 9 is formed with a port 20 communicating at its inner end with the chamber 14 at a point just below the lower end of the stud 7. It will be clear that water passing valve 16 when the latter is opened discharges through port 20 onto the shelves down which it flows by gravity to the lower ends thereof. The valve 16 is only slightly less in outside diameter than the diameter of that portion of the port 18 occupied by it so that when the valve is opened by a downward movement thereof the water is permitted only to trickle down the inclined shelves 19 to the lower ends of the latter where, owing to capillary attraction, it will hang or dwell for a while in drops as indicated in Fig. 3. While it thus hangs or dwells in the form of drops at the lower ends of the shelves it is taken off by the chicken.

The lower end of the stem 10 is soldered or otherwise fastened to the middle of a platform 21, preferably made from galvanized sheet metal, said platform being normally supported immediately above the top of catch-basin 1 by the spring 12 acting through stem 10, and at all times serving as a cover which closes the top of said basin so that the contents of the latter is inaccessible to the chickens. Immediately below each shelf 19 the cover-platform 21 is formed with a hole or opening 22 through which the water that drips from the shelf above the same drops into the catch-basin 1, each of said holes being made so small that the chickens cannot reach through and drink from the contents of the basin.

The power of spring 12 is gaged so as to normally support the valve 16 in its closed position but at the same time in such manner as to permit the stem 10 to be carried downward sufficiently to permit valve 16 to open when one or more chickens step up onto the cover-platform 21. It will be clear, therefore, that the fountain is automatically operated to deliver water from the reservoir by the chickens and that the amount delivered to the shelves will vary according to the number of chickens occupying the cover-platform.

What I claim is:

1. A fountain of the character described comprising a reservoir for holding a supply of water and made with an outlet; a valve controlling said outlet; means through which an animal seeking water at the fountain automatically operates said valve to effect a trickling discharge of water from said reservoir restricted to drops, and a shelf accessible to the animal onto which the discharged water is delivered by said outlet, said shelf being inclined downwardly toward its outer end so that the water flows toward said outer lower end and hangs from the same in the form of a drop.

2. A fountain of the character described comprising a reservoir for holding a supply of water and made with an outlet; a valve controlling said outlet; means through which an animal seeking water at the fountain automatically operates said valve to effect a restricted discharge of water from said reservoir, a shelf accessible to the animal, onto which the discharged water is delivered by said outlet, said shelf being inclined downwardly toward one end so that the water flows toward said lower end and hangs therefrom in the form of a drop, and a covered catch basin below said shelf having an inlet opening located in the same vertical plane with the discharge end of said shelf so positioned that water falling from the latter drops through said inlet opening into the catch basin, the water collected within said catch basin being inaccessible to the animal.

3. A fountain of the character described comprising a reservoir for holding a supply of water and made with an outlet; a valve controlling said outlet; a shelf accessible to the animal onto which water passing said valve is delivered by said outlet; said shelf being inclined downwardly toward one end so that the water flows toward and drips from said lower end, a spring holding said valve normally closed; a platform below said shelf yieldingly supported by said spring and adapted to receive upon it the animal seeking water at the fountain and to be depressed by the weight of the animal, the downward movement of said platform acting to relieve said valve of the pressure of said spring so as to effect the discharge of water through said outlet.

4. A fountain of the character described comprising a reservoir for holding a supply of water and made with an outlet; a valve controlling said outlet; a shelf accessible to the animal onto which water passing said valve is delivered by said outlet; a spring holding said valve normally closed; a platform below said shelf yieldingly supported by said spring and adapted to receive upon it the animal seeking water at the fountain and to be depressed by the weight of the animal, the downward movement of said platform acting to relieve said valve of the pressure of said spring so as to effect the discharge of water through said outlet, a catch basin arranged below and covered by said platform, said platform having an opening therethrough located in the same vertical plane with the discharge end of the shelf so that droppings from said end fall through said opening into said catch basin, and a standard connecting the catch basin and reservoir.

5. A fountain of the character described comprising a reservoir for holding a supply of water made near its bottom with an outlet; a slidably mounted stem controlling said outlet and normally maintaining the latter closed; a spring yieldingly supporting said stem; a platform at the lower end of said stem made with a drain opening through it, and adapted to receive upon it the animal seeking water at the fountain so that said platform and stem are depressed by the weight of the animal to automatically effect the discharge of water from said reservoir through said outlet; a catch basin below and covered by said platform so that its contents are inaccessible to the animal, and a standard projecting upwardly from said catch basin and supporting said reservoir.

6. A fountain of the character described comprising a reservoir for holding a supply of water made near its bottom with an outlet; a shelf below said reservoir onto which water is delivered from said outlet; a valve in said outlet; a slidably mounted stem normally supporting said valve in its closed position; a spring yieldingly supporting said stem; a platform at the lower end of said stem made with a drain opening therethrough and adapted to receive upon it the animal seeking water at the fountain so that said platform and stem are depressed by the weight of the animal to automatically effect the discharge of water from said reservoir through said outlet; a catch basin below and covered by said platform so that its contents are inaccessible to the animal, and a standard projecting upwardly from said catch basin and supporting said reservoir.

Signed at Andover, Massachusetts, this 6th day of May, 1918.

MARTIN W. LYDON.